United States Patent [19]
Hosokawa et al.

[11] Patent Number: 5,498,215
[45] Date of Patent: Mar. 12, 1996

[54] REDUCTION GEAR ASSEMBLY

[76] Inventors: Toshihiro Hosokawa, 16-2 Kamitanabe-cho, Takatsuki-shi, Osaka-fu; Hitoshi Ohara, 557 Bundo-cho, Kamigyo-ku, Kyoto-shi, Kyoto-fu; Takahiro Nishikawa, 2-2-9 Aomadani-nishi, Mino-shi, Osaka-fu; Eiji Ishimoto, 2-4 Hachijogaoka, Nagaokakyo-shi, Kyoto-fu, all of Japan

[21] Appl. No.: 138,471

[22] Filed: Oct. 15, 1993

[30] Foreign Application Priority Data

Oct. 16, 1992 [JP] Japan .................. 4-078154 U
May 26, 1993 [JP] Japan .................. 5-032509 U

[51] Int. Cl.⁶ .................................................. F16H 1/32
[52] U.S. Cl. ........................ 475/162; 475/168; 475/178
[58] Field of Search .......................... 475/162, 165, 475/168, 178, 189, 195, 196

[56] References Cited

U.S. PATENT DOCUMENTS

| | | | |
|---|---|---|---|
| 4,177,695 | 12/1979 | Grove | 475/162 X |
| 4,440,044 | 4/1984 | Heller | 475/162 |
| 4,829,851 | 5/1989 | Imase | 475/168 |
| 5,167,590 | 12/1992 | Kratochvil et al. | 475/178 |
| 5,197,930 | 3/1993 | Imase | 475/168 |

FOREIGN PATENT DOCUMENTS

| | | | |
|---|---|---|---|
| 482529 | 4/1992 | European Pat. Off. | 475/162 |
| 8201923 | 6/1982 | WIPO | 475/162 |

Primary Examiner—Khoi Q. Ta

[57] ABSTRACT

A pin-ball type reduction gear comprising of a casing rotatably supporting an input shaft and an output shaft such that the input shaft is butted against the output shaft with an interval. A planetary disk eccentrically and rotatably supported by the input shaft. A wave-shaped epitrochoid curve groove, and balls in the number larger than that of the waves of the epitrochoid curve groove, which are provided between the casing and the planetary disk in such a manner as to be engaged with each other and a plurality of pins provided between planetary disk and the output shaft so as to be in parallel to the input shaft and the output shaft, and pin insertion holes each inserted with the pins. The pins and pin insertion holes in the same number are disposed along a circle of the planetary disk or output shaft around the axis of the planetary disk or output shaft and gaps allowing the eccentric motion of the planetary disk to the output shaft are each formed between the pin insertion holes and pins.

9 Claims, 10 Drawing Sheets

1

REDUCTION GEAR ASSEMBLY

FIELD OF THE INVENTION

The present invention relates to a reduction gear assembly characterized by novel features of construction and arrangement including the use of balls to reduce rotational speeds and the utilization of pins to prevent the application of a thrust load from the outside to its internal structure.

BACKGROUND OF THE INVENTION

A typical reduction gear of the prior art is that shown in FIGS. 11 and 12, which utilizes balls as power transmission elements. The assembly includes reduction gear 20 constituted of a drive shaft 22 having a cam 21 with an eccentric distance e. The assembly further includes a ball type Oldham's coupling 23, a ring-like eccentric plate 25 formed with a hypocycloid curve groove 24 on a cam 21.

The assembly further includes a driven disk 27 including an epicycloid curve grooved 26 having waves in number less than that of the hypocycloid curve by an even number and a driven shaft 28 is integrated with the driven disk 27. The eccentric plate 25 is opposed to the driven disk 27 through balls 29.

In operation therefore, when the drive shaft 22 is rotated, the eccentric plate 25 revolves tracing or depicting a circle having a radius e by the cam 21 in such a state as to be restricted in its rotation by the Oldham's mechanism 23. Thus, the eccentric plate 25 performs the eccentric motion. When the eccentric plate 25 revolves by the number of the waves of the groove 24, the driven disk 27 is rotated by the number of the above waves by the groove 26 and the balls 29.

The hypocycloid curve means the locus depicted by one point on the circumference of a rotating circle revolving along the inner side of a reference circle. The epicycloid curve means the locus depicted by one point on the circumference of the rotational circle revolving along the outer side of a reference circle.

The prior art differential reduction gears have certain disadvantages and drawbacks. For example, when an output shaft is applied with a thrust load coming from a leftward direction, as shown in FIG. 11, the balls and the groove are applied with a pressing force is exerted on the balls and groove of a sufficient magnitude to prevent the generation of a backlash between the balls and the groove to increase the Hertzian contact stress whereby the balls and groove are susceptible to damage and severe abrasion.

On the other hand, when an output shaft is applied with a thrust load coming from the rightward direction as shown in FIG. 11, the balls and the groove are separated from each other producing generated backlash therebetween.

SUMMARY OF THE INVENTION

The present invention provides a reduction gear assembly characterized by novel features of construction and arrangement which solves the problems inherent in the prior art system discussed above. In accordance with the present invention, there is provided a pin-ball type reduction gear assembly comprising a housing or casing rotatably supporting an input shaft and an output shaft mounted in such a way the input shaft abuts against the output shaft with an interval. The assembly further includes a disk eccentrically and rotatably supported by the input shaft and a wave shaped epitrochoid curve groove and a plurality of balls amounting in number greater than that of the waves of the epitrochoid curved groove located between the housing and the planetary disk in such a manner to be engaged with each other. The assembly further includes a plurality of pins provided between the disk and the output shaft located parallel to the input and the output shafts and pin insertion holes for the pins. In accordance with the reduction gear assembly of the present invention, the pins and the pin insertion holes are disposed along a circle of the disk or on the output shaft around the axis of the planetary disk are on the output shafts. Gaps are provided allowing the eccentric motion of the disk to the output shaft are each formed between the insertion holes and the pins.

The following definitions apply. The number of waves in the epitrochoid curve groove is $Z_a$ and the number of balls is taken as $Z_b$. Further the eccentric amount of the planetary disk is defined as e. The epitrochoid curve means a locus depicted by a point on the outer or inner side of a rotation circle revolving along the outer side of a constant reference circle.

Considering now the operation of a planetary disk assembly in accordance with the present invention, assume that the casing is fixed and the input shaft is rotated in a rightward direction. Thus, the disk revolves rightward while depicting a circle with a radius e. Simultaneously, the disk is rotated rightward with a reduction ration in the order $[(Z_b-Z_a)Z_b]$ by meshing of the epitrochoid curve groove with the balls. More specifically, the disk is rotated by a difference between the number of the balls and the number of the waves of the epitrochoid curve groove during revolving by the number of the balls. During this operation, the rotational force of the disk is transmitted to the output shaft through pins and the pin insertion holes. Further, at this time even though the disk revolves with an eccentric motion with respect to the output shaft while depicting a circle having a radius e, this revolution is not obstructed because of the gaps which are formed between the pins and the holes.

By this construction, the output shaft is rotated in the same direction as the input shaft and the disk at a rotational speed retarded from the input shaft.

Further, even if an external thrust load is applied to the output shaft, the disk is not applied with this thrust load since the output shaft and the disk are connected to each other in the rotational direction through the pins and the pin insertion holes. Consequently, the balls in the epitrochoid curve groove are prevented from contacting one another and being separated from each other.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
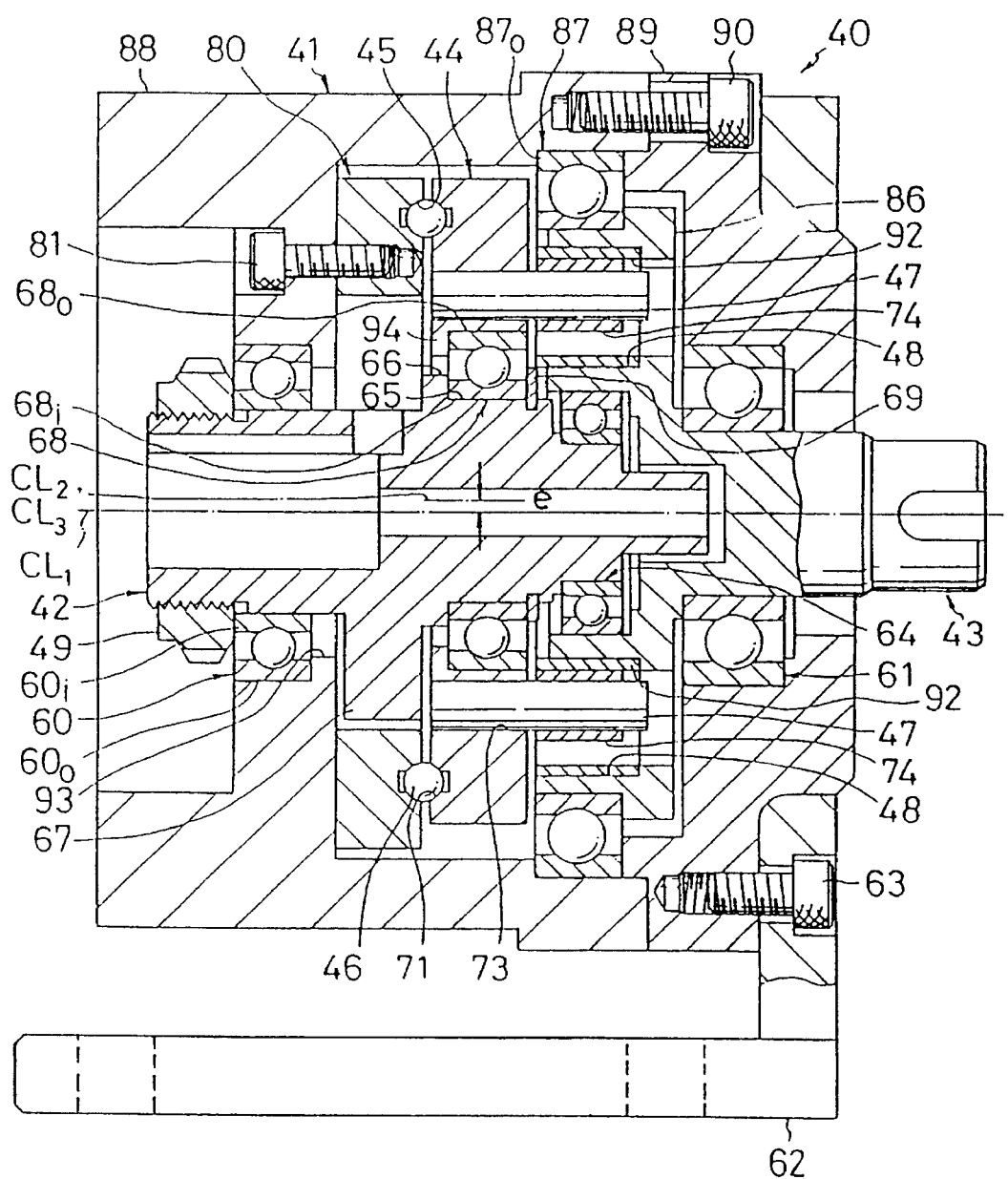
FIG. 1 is a front view of a pin-ball type reduction gear according to an embodiment of the present invention, and a sectional view along the input and output shafts.

Referring now to the drawings and particularly to FIGS. 1–10 thereof, there is shown an embodiment of reduction gear assembly in accordance with the present invention. The assembly comprises a pin-ball type reduction gear 40 comprising a casing 41, input and output shafts 42 and 43 respectively, a disk 44, a waved shaped epitrochoid groove 45, and balls 46. The epitrochoid curve groove 45 and the balls 46 function to reduce the rotational speed transmitted from the outside to the input shaft 42.

The assembly further includes pins 47, pins insertion holes 48 and a fastening nut 49. The pins 47 and the pin insertion holes 48 function to transmit the rotational force of the disk 44 rotating with a reduced rotational speed and also prevent thrust load applied from the outside to the output shaft 43 from applying to the disk 44. The fastening nut 49 is adjustable to thereby adjust the backlash between the epitrochoid curve groove 45 and the balls 46.

Considering now other more specific details of the reduction gear assembly, the casing 41 (See FIG. 1) rotatably supports the input shaft 42 and the output shaft 43 on bearings 60 and 61 respectively in a manner whereby the input shaft 42 is abutted against the output shaft 43 with an interval. A support leg 62 for supporting the assembly on a surface is mounted on the casing by bolt means 63.

The input shaft 42 is formed with a cam 65 having a eccentric e and a large diameter portion 66 formed on an intermediate portion of the input shaft 42. Also formed at an intermediate portion of the input shaft 42 is a balance 67 for counteracting the weight of the cam 65 and the planetary disk 44. The ring-like disk 44 is rotatably mounted on the cam 65 in the present instance by a rolling bearing 68. Note that the axis $CL_2$ of the cam 65 corresponds to the axis $CL_3$ of the planetary disk 44.

The inner-ring $68_i$ of the bearing 68 is pressed fitted in the cam 65 to restrict movement toward the thrust direction by a snap-ring 69 mounted around the input shaft 42 and the large diameter portion 66. The outer-ring $68_o$ of the bearing 68 is press fitted in the planetary disk 44 and is contacted with an internal flange 94 of disk 44.

Figure 2:
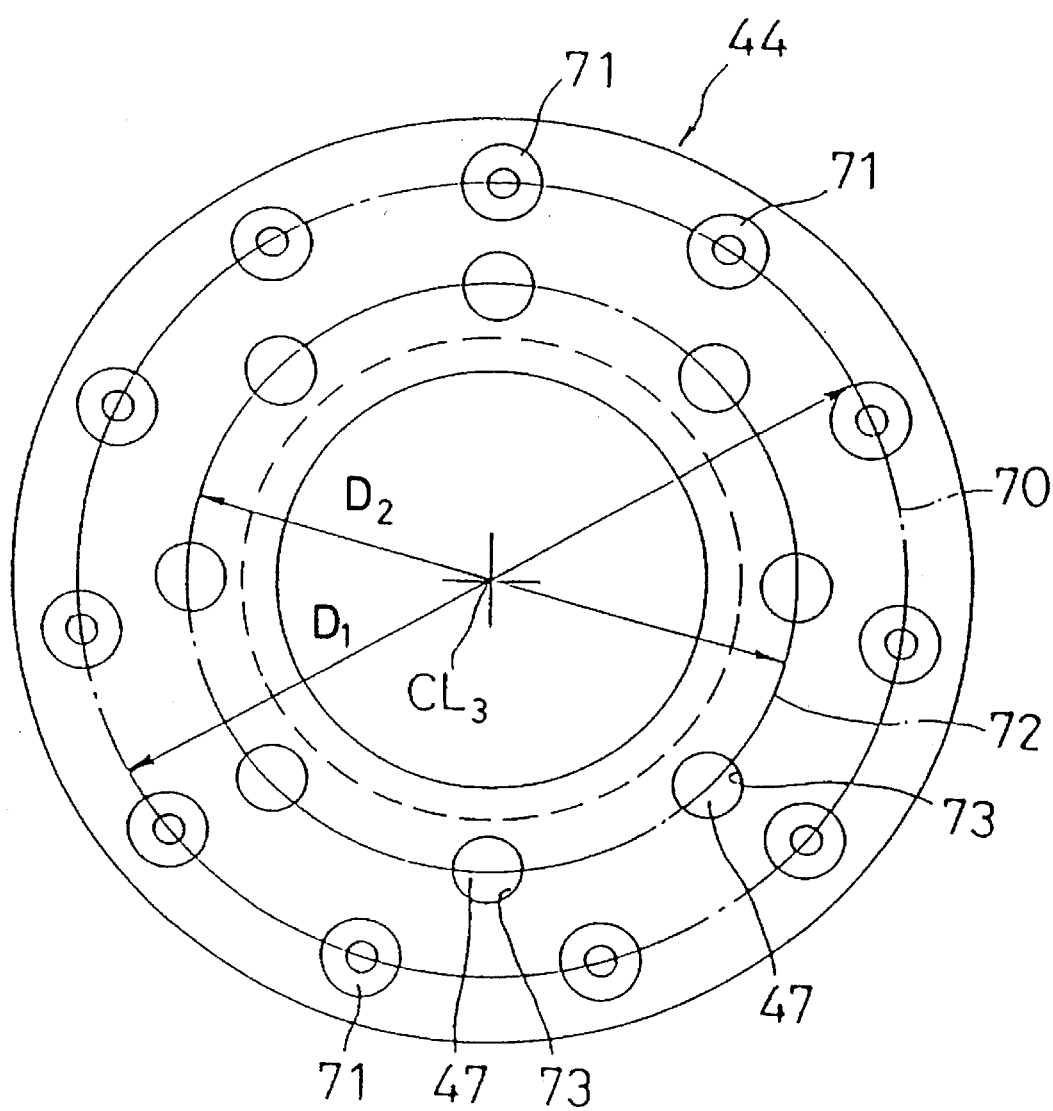
FIG. 2 is a side view of a planetary disk.

As best shown in FIG. 2, the side surface of disk 44 on the input shaft side has plurality of circumferentially equally spaced recess portions 71 located along disposition circle 70 of a diameter $D_1$ located coaxially with the axis $CL_3$ of the planetary disk 44. The recessed portion 71 define sinks for holding the balls 46. Thus, the disposition circle 70 defines the disposition circle of the balls 46.

Disk 44 also has a series of through holes 73 equi-spaced circumferentially along a disposition circle 72 of diameter $D_2$ around the axis $CL_3$. Pins 47 are press fitted in the through holes 73 so that they are aligned parallel to the input and output shafts 42 and 43 respectively. A roller 74 is rotatably fitted in the pin 47 which functions to smoothly transmit the rotational force of the planetary disk 44 to an output disk 86 described in more detail hereinafter.

Figure 3:
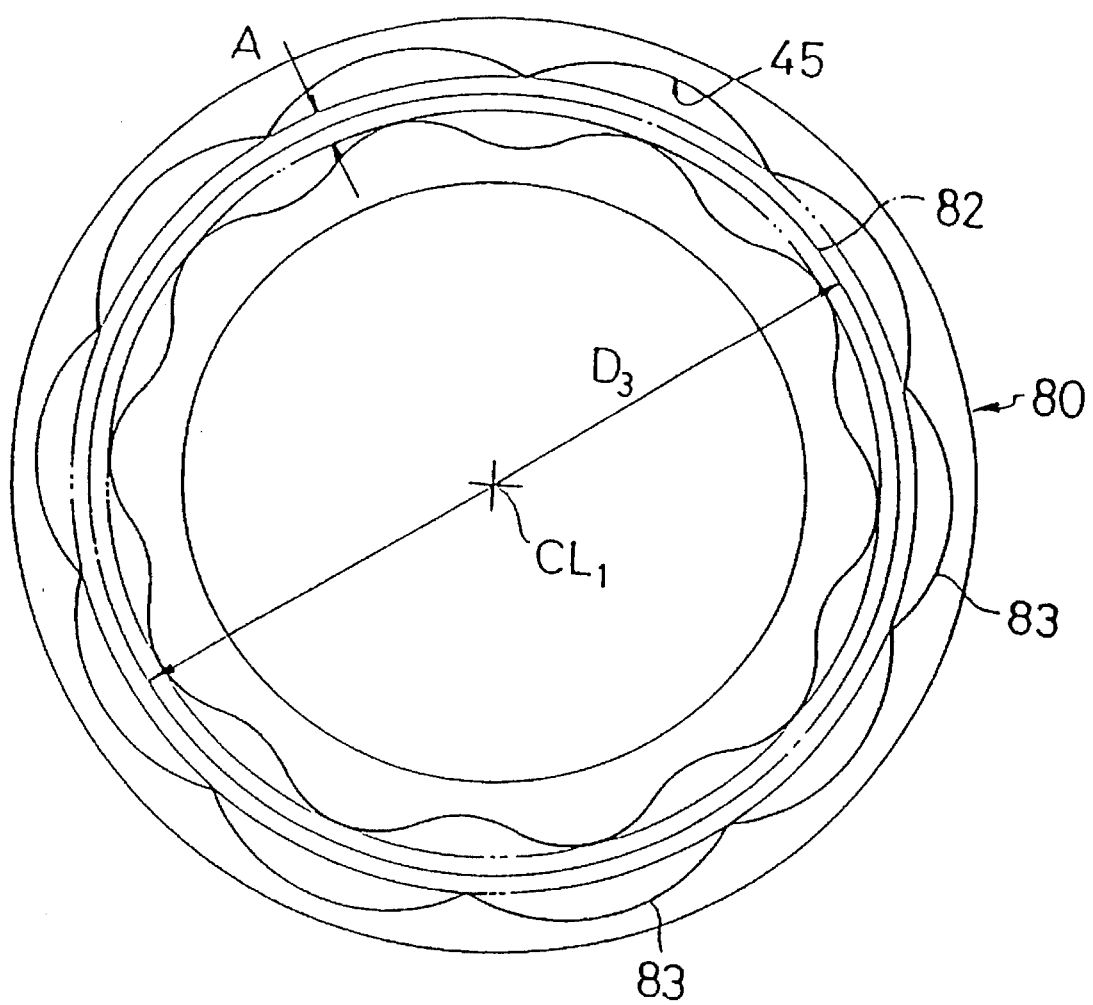
FIG. 3 is a side view of a fixed disk.

The reduction gear assembly further includes a fixed disk 80 mounted on the inner wall of the casing 41 (See FIG. 1) by a bolt 81. As shown in FIG. 3 the epitrochoid curve groove 45 is formed on the side surface of the fixed disk 80 in an opposing relationship to the planetary disk 44. The epitrochoid curve groove 45 comprises a wave-shaped groove having an amplitude A. Equivalent to twice the eccentric e of the planetary disk 44 on the basis of a pitch circle 82 having a diameter $D_3$ around the axis of $CL_1$ of the input shaft 44. As best illustrated in FIG. 3, the curve groove 45 is formed of ten (10) circumferentially spaced wave segments 83. Further, the diameter $D_3$ of pitch circle 82 is equal to the diameter $D_1$ of the disposition circle 70.

Figure 4:
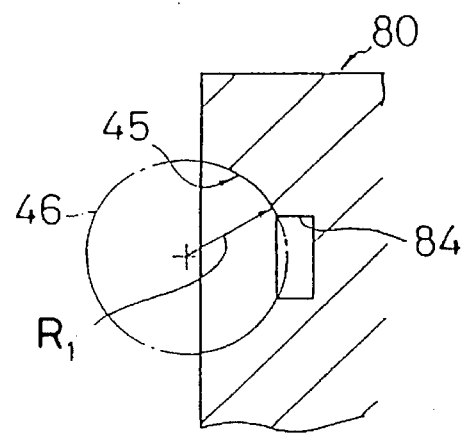
FIG. 4 is a sectional view of an epitrochoid curve groove.

The sectional shape of the epitrochoid curve groove 45 is, as shown in FIG. 4, formed to be approximately similar to the spherical shape of the ball 46. An escape groove 84 for preventing the bottoming of each ball 46 is formed on the bottom portion of the epitrochoid curve groove 45, along the wave-shape of the epitrochoid curve groove 45. The escape groove 84 is omitted in FIG. 3.

The depth of the epitrochoid curve groove 45 is set to be smaller than a radius $R_1$ of the ball 46 except for the depth of the escape groove 84.

Figure 5:
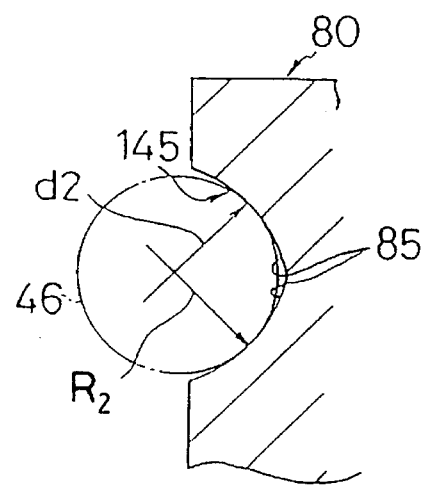
FIG. 5 is a sectional view of an epitrochoid curve groove according to another embodiment.

As shown in FIG. 5, the sectional shape of the epitrochoid curve groove may be formed of two circular-arcs 85, 85 each having a curvature radius $R_2$ larger than the radius $R_1$ of the ball 46. In this case, the epitrochoid curve groove 145 can prevent the bottoming of the ball 46. In addition, by reversing the disposition relationship between the recessed portions and the epitrochoid curve groove, the recessed portions may be formed on the fixed disk 80 and the epitrochoid curve groove 45 may be formed on disk 44.

The output disk 86 is formed integrally with the output shaft 43. The output disk 86 is supported on the casing 41 by a bearing 87. An outer ring $87_o$ of the bearing 87 is held between a main body 88 of the casing 41 and a cover 89 by the fastening of a bolt 90.

Figure 6:
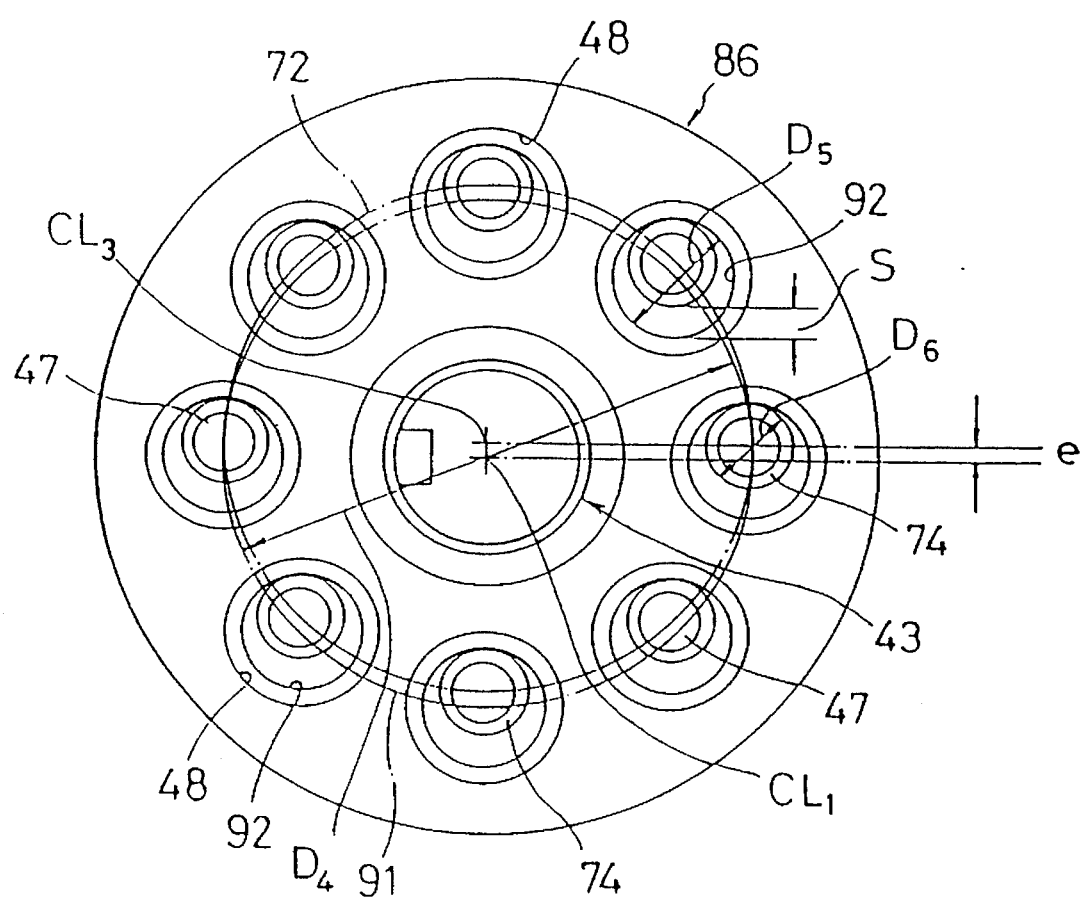
FIG. 6 is a side view of an output disk showing the state that pins are inserted in pin insertion holes.

As shown in FIG. 6, the assembly further includes a plurality of pin insertion holes 48 circumferentially equi-spaced along a disposition circle 91 of a diameter $D_4$ around the axis $CL_l$ of the output shaft 43. The diameter $D_4$ of the disposition circle is equal to the diameter $D_2$ of the disposition circle 72, (See FIG. 2.)

A bushing 92 is press fitted in each of the pin insertion holes 47, as shown in FIG. 6 and pin 47 has a roller 74 inserted in each of the bushing 92. The inside diameter $D_5$ of the bushing 92 is equal to the sum of an outside diameter 76 of the roller 74 an amount twice the eccentric of the planetary disk 44. In other words $[D_5=D_6+(2\times e)]$. Thus, a gap S is provided between the bushing 92 and the roller 74 of a value of about (2×e). The reason for the gap S being twice as much as the eccentric amount of disk 44 is that disk 44 is allowed to revolve in an eccentric motion while depicting a circle of radius e with respect to the output shaft 43.

It is noted, that the bushing 92 and the roller 74 are not necessarily required and in this instance, the gap S between pin 47 and the pin insertion hole 48 becomes the value of (2×e).

The fastening nut 49 is screwed in the input shaft 42 (see FIG. 1). The fastening nut 49 is contacted with the side surface of an inner ring $60_i$ of the bearing 60 rotatably supporting the input shaft 42 on the casing 41. The side surface of an outer ring 600 of the bearing 60 is contacted with an inner flange 93 of the casing 41.

Accordingly, when the fastening nut 49 is secured, the fixed disk 80 and the planetary disk 44 are located close to each other by the fastening nut 49 and the snap-ring 69, to clamp the balls 46, thus eliminating the backlash between the epitrochoid curve groove 45 and the balls 46. By further tightening of the fastening nut 49, it is possible to pre-load the epitrochoid curve groove 45 and the balls 46.

The action will be described below.

Here, the number of the waves in the epitrochoid curve groove 45 is taken as $Z_a$, and the number of the balls 46 is taken on $Z_b$. When the casing 41 is fixed and the input shaft 42 is rotated rightward, the planetary disk 44 revolves rightward while depicting a circle with a radius e. The revolving number of disk 44 is equal to the rotating number of the input shaft 42. At the same time, disk 44 is rotated rightward with a reduction ratio of $[(Z_b-Z_a)/Z_b]$ by meshing of the epitrochoid curve groove 45 with the balls 46. In this embodiment, since it is assumed that $Z_a=10$ and $Z_b=11$, the reduction ratio becomes the value of (1/11). Namely, disk 44 is rotated by a difference between the number of the balls 46 and the number of the waves 83 of the epitrochoid curve groove 45 during revolving by the number of the balls 46.

The rotational force of disk 44 is transmitted to the output shaft 43 through the pins 47 and the pin insertion holes 48.

At this time, although disk 44 also revolves with respect to the output disk 86, this revolution is allowed by the gaps S each formed between the rollers 74 around the pins 47 and the bushes 92 of the pin insertion holes 48. Accordingly, the output shaft 43 is rotated in the same direction as the input shaft 42 and disk 44 is as to be retarded from the input shaft 42.

Even if the output shaft 43 is applied with a thrust load from the outside, since the output shaft 43 and disk 44 are connected to each other only in the rotational direction through the pins 47 and the pin insertion holes the disk is not applied with the thrust load. Consequently, the balls 46 and the epitrochoid curve groove 45 are prevented from being press contacted with each other and being separated from each other.

Figure 7:
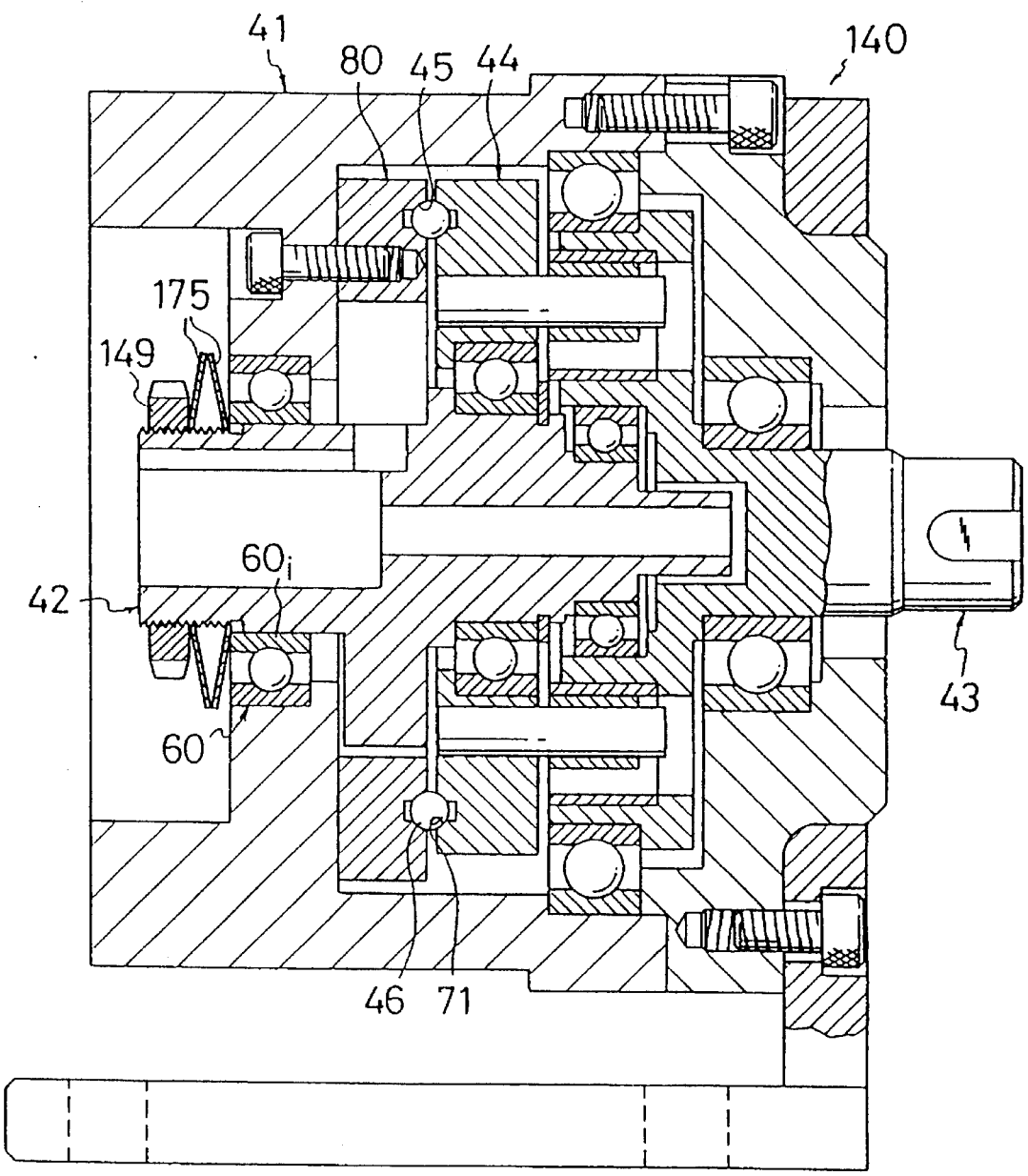
FIG. 7 is a front view of a pin-ball type reduction gear according to anther embodiment of the present invention, and an sectional view along the input and output shafts.

There is shown in FIG. 7 another embodiment of the present invention. In accordance with this embodiment, reduction gear 140 comprises two disk springs (elastic bodies) 175 and 175 oppositely interposed between a fastening nut 149 and an inner rim $60_i$ of a bearing 60, so that an input shaft 42 is energized in the direction of being pulled form a casing 41 by the disk springs 175 and 175. Thus the balls 46 are clamped between an epitrochoid curve groove 45 and recessed portion 71.

Figure 8:
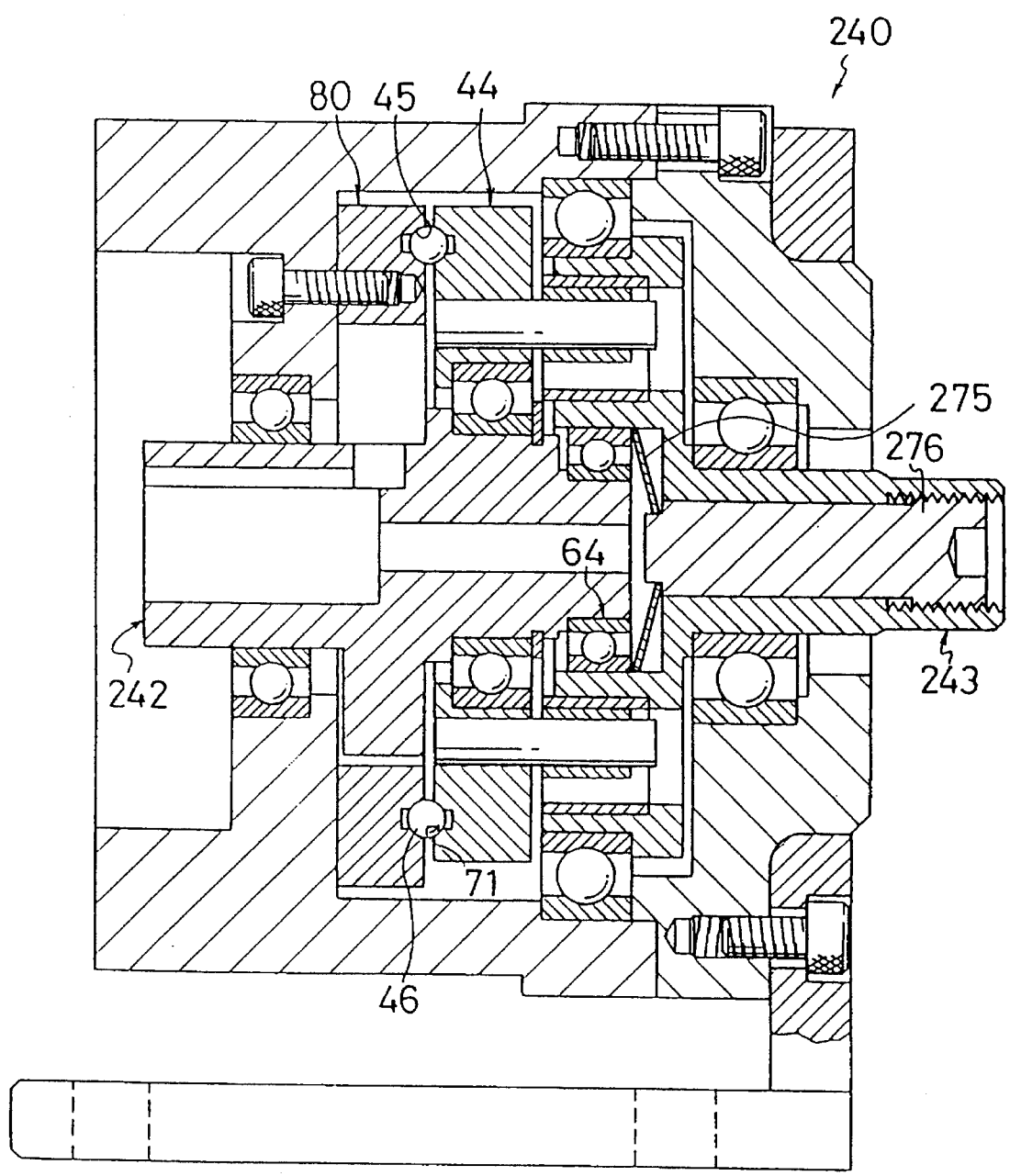
FIG. 8 is a front view of a pin-ball type reduction gear according to a further embodiment of the present invention, and an sectional view along the input and output shafts.

There is shown in FIG. 8 another embodiment of the present invention. In accordance with this embodiment, reduction gear 240 comprises a pre-load adjusting bolt 276 screwed through the axis of an output shaft 243 in the direction of separating them from each other by a disk spring (elastic body) 275 interposed between the pre-load adjusting bolt 276 and a bearing 64, thus clamping balls 46 by an epitrochoid curve groove 45 and recessed portions 71. In this case, the fastening nut 49 as shown in FIG. 1 may be provided, or may be not provided.

Figure 9:
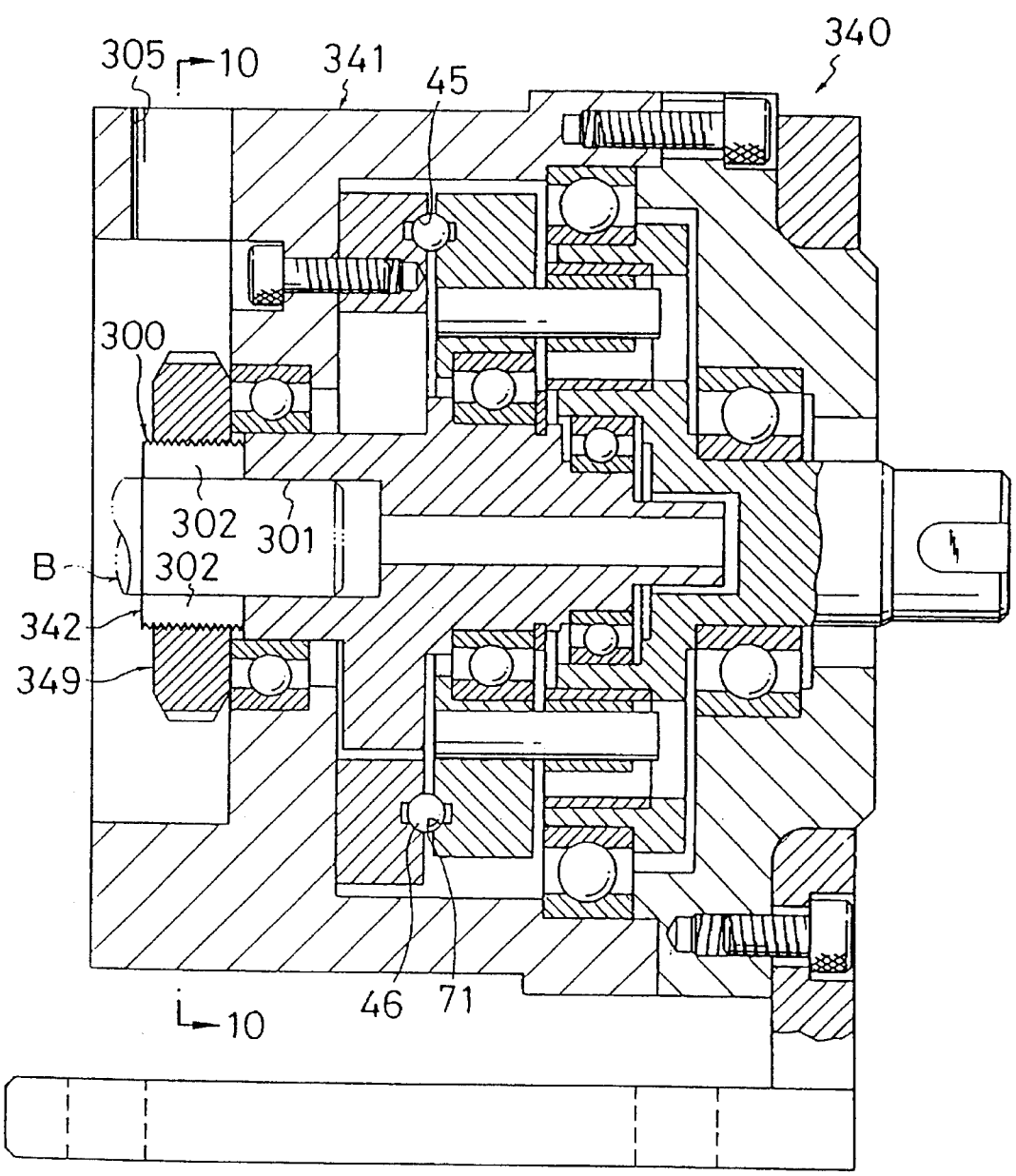
FIG. 9 is a front view of a pin-ball type reduction gear according to a still further embodiment of the present invention, and an sectional view along the input and output shafts.
Figure 10:
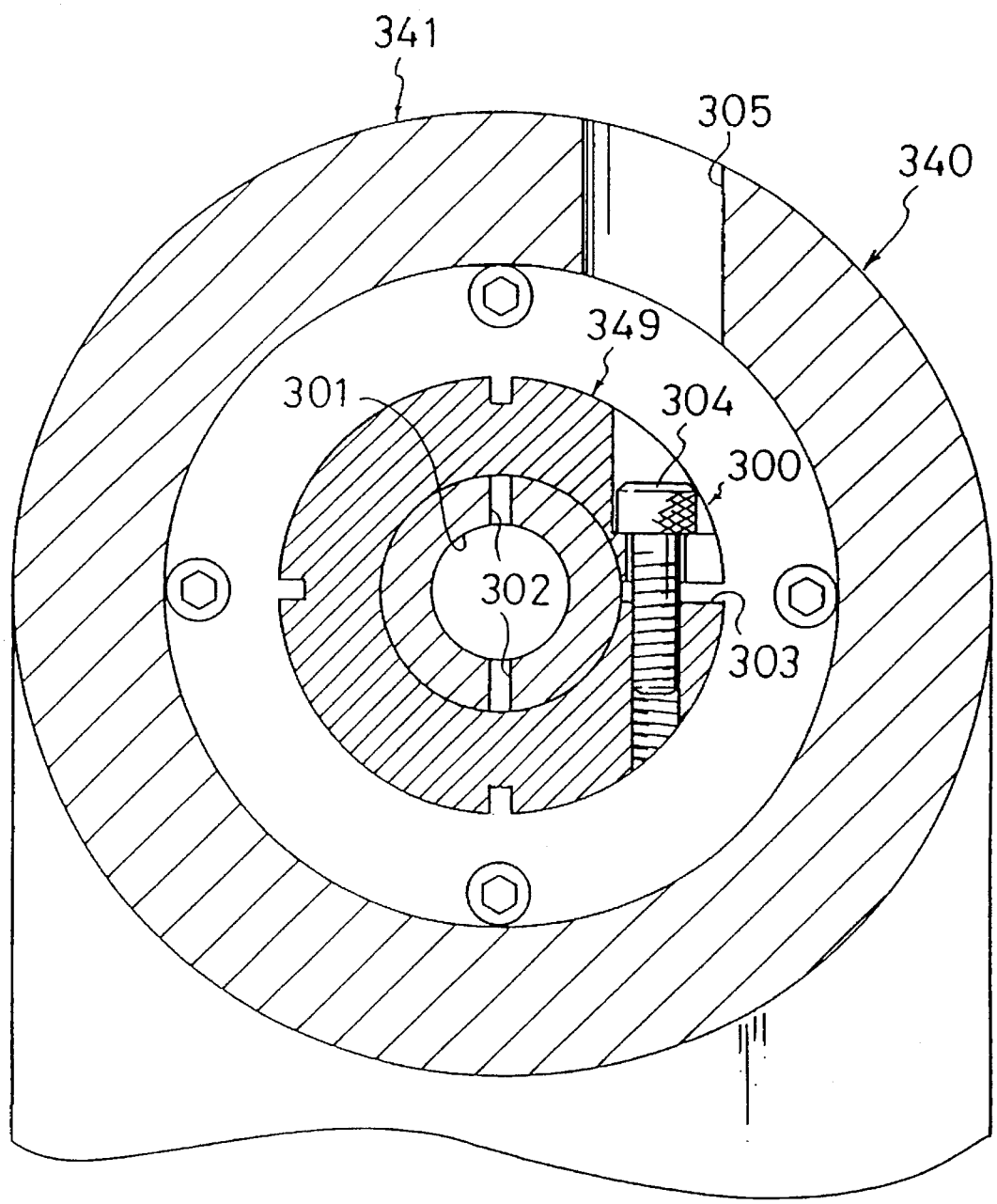
FIG. 10 is a sectional view taken along the line 10—10 in FIG. 9.
Figure 11:
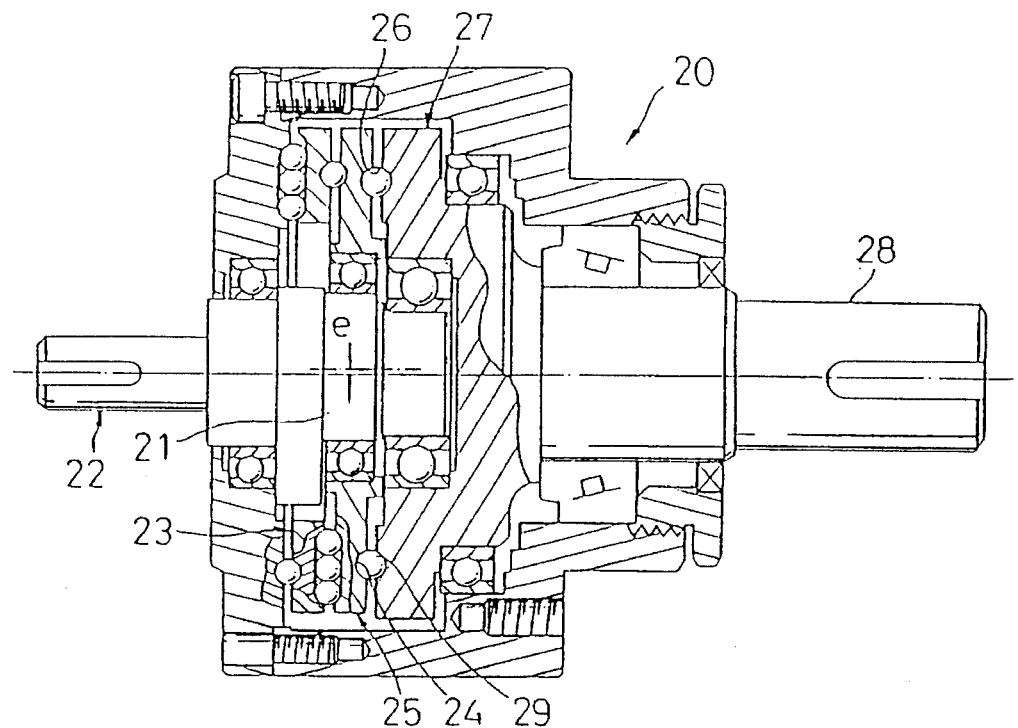
FIG. 11 is a front view of a prior art ball type reduction gear, and a sectional view along a drive shaft and a driven shaft.
Figure 12:
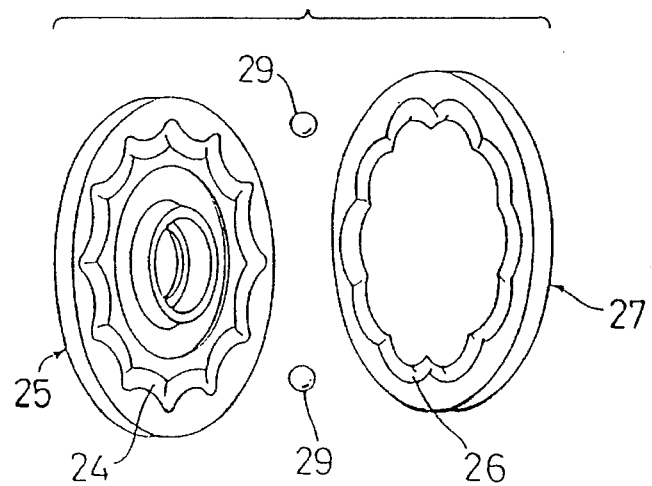
FIG. 12 is a perspective view of an eccentric board and a driven disk.

There is shown in FIG. 9 another embodiment of the present invention. In accordance with this embodiment, reduction gear 340 comprises in using a fastening nut 349, the following drive system connecting mechanism 300 for connecting an input shaft 342 to a drive shaft of a drive system, for example, a rotational shaft B of a motor (not shown) may be incorporated in the input shaft 342: A drive shaft insertion hole 301 inserted with the rotational shaft B is formed at the axis of the input shaft 342.

Drive shaft fastening slits 302 and 302 are formed on the thick-walled portion of the input shaft 342 projecting from the drive shaft insertion hole 301 in the axial direction of the input shaft 342 while passing through the thick-walled portion. An input shaft fastening slit 303 is radially formed in the fastening nut 349. Further, an input shaft fastening bolt 304 is screwed in the fastening nut 349 while crossing the input shaft fastening slit 303.

The procedure for connecting the motor with the reduction gear 340 using the above drive system connecting mechanism 300 will be described below. First, the fastening nut 349 perform the adjustment for giving a pre-load to an epitrochoid curve groove 45 and balls 46. Next, the rotational shaft B is inserted in the drive shaft insertion hole 301, and the input shaft fastening bolt 304 is fastened by a tool, for example, a hexagonal wrench (not shown) inserted from a through hole 305 formed on the casing 341 or from the side surface of the reduction gear 340, to clamp the input shaft fastening slit 303 and the drive shaft fastening slits 302 and 302. Thus, the rotational shaft B is fastened by the input shaft 342, to be integrated and connected with the input shaft 342. In addition, in the reduction gear 340 including the drive system connecting mechanism 300, there may be provided a pair of the disk springs 175 and 175 as shown in FIG. 7, and the pre-load adjusting bolt 276 and the disk spring 275 as shown in FIG. 8.

The following summarizes the functional advantages of a reduction gear assembly in accordance with the present invention:

1. Since the output shaft and disk 44 are connected to each other only in the rotational direction by the pins and the pin insertion holes, even when the output shaft is applied with a thrust load, disk 44 is not applied with the thrust load. This prevents the balls and the epitrochoid curve groove from being press-contacted with each other or being separated form each other. Therefore, it is possible to prevent the damage of the balls and the epitrochoid curve groove and an increase in the backlash.

2. Since the balls are provided between the casing and disk 44, it is possible to make small the outside diameter of the reduction gear.

3. Since the balls are used, it is possible to make smooth the transmission of the rotational force and to prevent the generation of noise.

4. The snap-piece and the fastening nut on the input shaft at both sides of the casing and the inner ring of the bearing facilitate adjustment of the backlash between the balls and the epitrochoid curve groove to be optimum.

5. The one or two elastic bodies provide for automatic adjustment of the backlash between the balls and the epitrochoid curve groove are worn after use for a long term.

6. The one or two elastic bodies provide for automatic adjustment of the backlash, to almost eliminate the need for further fastening the fastening nut even if the reduction gear is used for a long term, and hence to make easy the maintenance.

7. The one or two elastic bodies provide for easy adjustment of the backlash as compared with the case of two elastic body. Namely, in the case of no elastic body, the slight fastening of the fastening nut or the pre-load adjusting bolt largely changes the pressure applied to the balls, so that the adjustment takes a lot of time. On the contrary, with the presence of the one or two elastic bodies, since the elastic bodies are deformed, a change in pressure is made smaller, thus making easy the adjustment in backlash.

8. With one or two elastic bodies, the elastic force of the elastic bodies is usually applied to the fastening nut and the pre-load adjusting bolt, thereby preventing the loosening of the fastening nut and the pre-load adjusting bolt.

9. The drive system connecting mechanism means the thrust force is not applied to the input shaft when the drive shaft of the drive system is incorporated.

10. The drive system connecting mechanism makes it possible to incorporate the drive system.

11. By the drive system connecting mechanism, the drive shaft and the input shaft can be fastened by the face pressure using the deformation of the slits, so that the torque transmission is performed by the frictional force, thus eliminating the generation of the backlash between the drive shaft and the input shaft.

12. With a drive system connecting mechanism, the fastening nut is fastened by the input shaft fastening bolt, which makes it possible to prevent the loosening of the fastening nut.

13. The drive system connecting mechanism facilitate separation of the reduction gear from the drive system only by loosening the fastening nut, and hence to make easy the removal of the drive system.

Even though, particular embodiments of the present invention have been illustrated and described herein, it is not intended to limit the invention and changes and modification may be made therein within the scope of the following claims.

Accordingly, in the scope of the claims, "the gaps each formed between the pin insertion holes and the pins" includes not only the "the gaps each formed between the pins and the pin insertion holes", but also "the gaps each formed between the rollers and the bushes" in the case that the rollers are each mounted around the pins and the bushes are each press-fitted in the pin insertion holes.

In addition, by reversing the relationship between the pins and the pin insertion holes, the pins may be projectingly provided on the output disk 86 and the pin insertion holes may be formed on disk 44. In this case, disk 44 is made light, which makes it possible to make smaller the balancer 67.

What is claimed is:

1. A pin-ball type reduction gear comprising a casing rotatably supporting an input shaft and an output shaft in a manner wherein said input shaft opposes said output shaft with an interval;

a disk eccentrically and rotatably supported on said input shaft by a first rolling bearing, said input shaft supported on a casing by a second roller bearing;

a wave-shaped epitrochoid curve groove disposed on a side of said casing and a plurality of balls of a number greater than that of the waves of said epitrochoid curve groove disposed between said side of said casing and said disk as to engage each other;

an output disk operatively connected to said output shaft;

a plurality of pins provided between said disk and said output disk so as to be parallel to said input shaft and said output shaft, and pin insertion holes each inserted with said pins, said pins and said pin insertion holes disposed on a circular locus on both said disks around the axis of both said disks;

means defining gaps formed between said pin insertion holes of said output disk and said pins allowing eccentric motion of said output disk relative to said output shaft;

a snap ring engaged with said input shaft outside of said first rolling bearing;

a fastening nut engaged with said input shaft outside said second rolling bearing.

2. A pin-ball type reduction gear according to claim 1, wherein an elastic body is provided between said casing and said fastening nut so as to urge said input shaft in the direction of press-contacting said epitrochoid curve groove and said balls with each other.

3. A pin-ball type reduction gear comprising a casing rotatably supporting an input shaft and an output shaft in a manner wherein said input shaft opposes said output shaft with an interval;

a disk eccentrically and rotatably supported on said input shaft by a first rolling bearing, said input shaft supported on a casing by a second roller bearing;

a wave-shaped epitrochoid curve groove disposed on a side of said casing and a plurality of balls of a number greater than that of the waves of said epitrochoid curve groove disposed between said face of said casing and said disk as to be engaged with each other;

an output disk operatively connected to said output shaft;

a plurality of pins provided between said disk and said output disk so as to be parallel to said input shaft and said output shaft, and pin insertion holes each inserted with said pins, said pins and said pin insertion holes disposed along a circular locus on both said disks around the axis of both said disks;

means defining gaps formed between said pin insertion holes of said output disk and said pins allowing eccentric motion of said disk relative to said output shaft;

a pre-load adjusting bolt screwed through said output shaft and an elastic body between said pre-load adjusting bolt and said input shaft so a to energize said input shaft in the direction of press-contacting said epitrochoid curve groove and said balls with each other.

4. A pin-ball type reduction gear comprising a casing rotatably supporting an input shaft and an output shaft in a manner wherein said input shaft opposes said output shaft with an interval;

a disk eccentrically and rotatably supported on said input shaft by a first rolling bearing, said input shaft supported on a casing by a second roller bearing;

a wave-shaped epitrochoid curve groove disposed on a side of said casing and a plurality of balls of a number greater than that of the waves of said epitrochoid curve groove disposed between said face of said casing and said disk as to be engaged with each other;

an output disk operatively connected to said output shaft;

a plurality of pins provided between said disk and said output disk so as to be parallel to said input shaft and said output shaft, and pin insertion holes each inserted with said pins, said pins and said pin insertion holes disposed along a circular locus on both said disks around the axis of both said disks;

means defining gaps formed between said pin insertion holes of said output disk and said pins allowing eccentric motion of said disk relative to said output shaft;

a drive system connecting mechanism comprising a drive shaft insertion hole formed within said input shaft concentrically therewith so as to be inserted with a drive shaft of a drive system;

a drive shaft fastening slit formed on the wall portion of said input shaft, an input shaft fastening slit radially formed on said fastening nut, and a drive fastening bolt screwed in said fastening nut intersection with said input shaft fastening slit.

5. A pin-ball type reduction gear comprising a casing rotatably supporting an input shaft and an output shaft in a manner wherein said input shaft opposes said output shaft with an interval;

a disk eccentrically and rotatably supported on said input shaft by a first roller bearing, said input shaft supported on a casing by a second roller bearing;

a wave-shaped epitrochoid curve groove formed on said casing and a plurality of balls of a number greater than that of the waves of said epitrochoid curve groove, said balls disposed between said casing and said disk so as to be engaged with each other;

an output disk joined to said output shaft;

a plurality of pins provided between said disk and said output disk so as to be parallel to said input shaft and said output shaft, and pin insertion holes each inserted with said pins, said pins and said pin insertion holes disposed on a circular locus on both said disks; and means defining gaps formed between said pin insertion holes of said output disk and said pins allowing eccentric motion of said disk relative to said output shaft.

6. A pin-ball type reduction gear comprising a casing rotatably supporting an input shaft and an output shaft in a manner wherein said input shaft opposes said output shaft with an interval;

a disk eccentrically and rotatably supported on said input shaft by a first roller bearing, said input shaft supported on a casing by a second roller bearing;

a wave-shaped epitrochoid curve groove formed on said casing and a plurality of balls of a number greater than that of the waves of said epitrochoid curve groove, said balls disposed between said casing and said disk so as to be engaged with each other;

an output disk joined to said output shaft;

a plurality of pins provided between an output disk and said output disk so as to be parallel to said input shaft and said output shaft, and pin insertion holes each inserted with said pins, said pins and said pin insertion holes disposed on a circular locus on both said disks around the axis of both said disks; and means defining gaps formed between said pin insertion holes of said output disk and said pins allowing eccentric motion of said disk relative to said output shaft;

a snap ring engaged with said input shaft outside of said first rolling bearing; and a fastening nut engaged with said input shaft outside said second rolling bearing.

7. A pin-ball type reduction gear according to claim 6, wherein an elastic body is provided between said casing and said fastening nut so as to urge said input shaft in the direction of press-contacting said epitrochoid curve groove and said balls with each other.

8. A pin-ball type reduction gear according to claim 6, including a drive system connecting mechanism comprising a drive shaft insertion hole formed within said input shaft concentrically therewith so as to be inserted with a drive shaft of a drive system; a drive shaft fastening slit formed on the wall portion of said input shaft, an input shaft fastening slit radially formed on said fastening nut, and a drive fastening bolt screwed in said fastening nut intersection with said input shaft fastening slit.

9. A pin-ball type reduction gear comprising, a casing rotatably supporting an input shaft and an output shaft in a manner wherein said input shaft opposes said output shaft with an interval;

a disk eccentrically and rotatably supported on said input shaft by a first roller bearing, said input shaft supported on a casing by a second roller bearing;

a wave-shaped epitrochoid curve groove formed on said casing and a plurality of balls of a number greater than that of the waves of said epitrochoid curve groove, said balls disposed between said casing and said disk so as to be engaged with each other;

an output disk joined to said output shaft;

a plurality of pins provided between said disk and said output disk so as to be parallel to said input shaft and said output shaft, and pin insertion holes each inserted with said pins, said pins and said pin insertion holes disposed on a circular locus on both said disks around the axis of both said disks; and means defining gaps formed between said pin insertion holes of said output disk and said pins allowing the eccentric motion of said disk relative to said output shaft;

a pre-load adjusting bolt screwed through said output shaft and an elastic body between said pre-load adjusting bolt and said input shaft so as urge said input shaft in the direction of press-contacting said epitrochoid curve groove and said balls with each other.

* * * * *

UNITED STATES PATENT AND TRADEMARK OFFICE
CERTIFICATE OF CORRECTION

PATENT NO. : 5,498,215
DATED : March 12, 1996
INVENTOR(S) : Hosokawa, et al

It is certified that error appears in the above-indentified patent and that said Letters Patent is hereby corrected as shown below:

In column 2, line 10, please delete the word "planetary".

In column 2, line 66, please correct the word "anther" to read --another--.

In column 3, line 51, please delete the phrase "the planetary".

In column 4, line 11, please delete the phrase "the planetary".

In column 4, line 14, please delete the phrase "the planetary".

In column 4, lines 54-55, please delete the phrase "the planetary".

UNITED STATES PATENT AND TRADEMARK OFFICE
CERTIFICATE OF CORRECTION

PATENT NO. : 5,498,215
DATED : March 12, 1996
INVENTOR(S) : Hosokawa, et al

It is certified that error appears in the above-indentified patent and that said Letters Patent is hereby corrected as shown below:

In column 5, line 3, please correct "600" to read --60.--.

In column 5, line 50, the word "form" should read --from--.

In column 6, line 42, the word "form" should read --from--.

In column 8, line 25, the word "face" should read --side--.

In column 8, line 53, the word "face" should read --side--.

In column 8, line 57, the word "shaft" should read --disk--.

UNITED STATES PATENT AND TRADEMARK OFFICE
CERTIFICATE OF CORRECTION

PATENT NO. : 5,498,215
DATED : March 12, 1996
INVENTOR(S) : Hosokawa, et al

It is certified that error appears in the above-indentified patent and that said Letters Patent is hereby corrected as shown below:

In column 9, line 26, after the phrase "both said disks", please insert the phrase -- around the axis of both said disks--.

In column 10, line 48, after the phrase "shaft so as", please insert the word --to--.

Signed and Sealed this

Twenty-fifth Day of June, 1996

*Attest:*

BRUCE LEHMAN

*Attesting Officer*   *Commissioner of Patents and Trademarks*